UNITED STATES PATENT OFFICE.

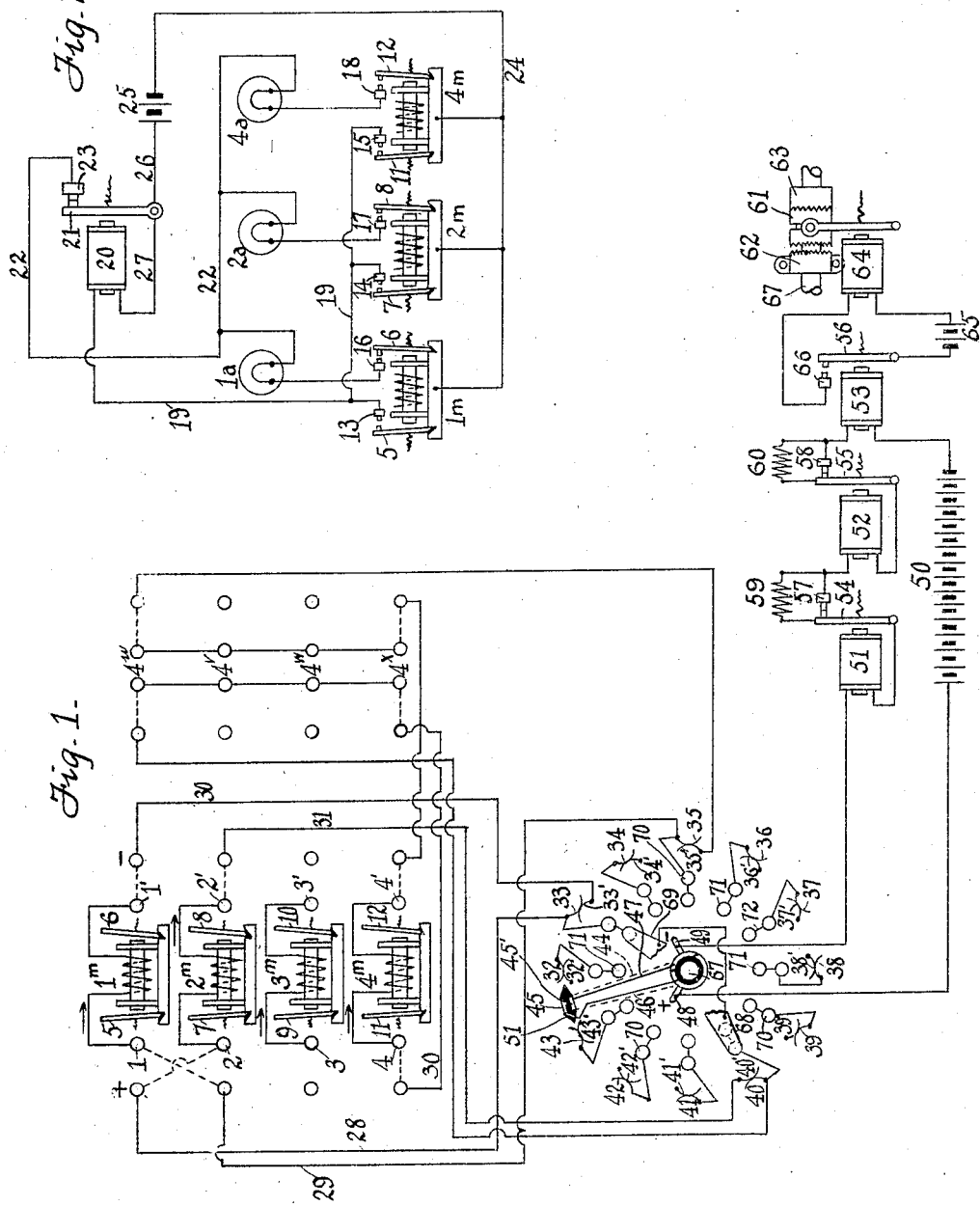

WILLIAM F. KEMBLE, OF ROCKAWAY BEACH, AND CHARLES R. UNDERHILL, OF YONKERS, NEW YORK, ASSIGNORS, BY DIRECT AND MESNE ASSIGNMENTS, OF ONE-HALF TO CHARLES S. CHAMPION, OF RIDGEWOOD, NEW JERSEY.

ACCOUNTING-EXCHANGE.

1,062,102.        Specification of Letters Patent.      Patented May 20, 1913.

Application filed February 3, 1908. Serial No. 414,001.

*To all whom it may concern:*

Be it known that we, WILLIAM F. KEMBLE and CHARLES R. UNDERHILL, citizens of the United States, and residents, respectively, of Rockaway Beach, in the county of Queens, State of New York, and Yonkers, in the county of Westchester and State of New York, have invented a certain new and useful Accounting-Exchange, of which the following is a specification.

This invention relates to an accounting exchange for determining by suitable apparatus the settlement of accounts between different persons, firms, etc.

The main object of the invention is to provide apparatus for determining quickly and accurately what persons, firms, etc., who are members of the exchange, have accounts owing to them or due others that can be offset, balanced or settled by accounts of other members of the exchange due to or owed by such other members.

In general, the object of this invention is to provide suitable machinery for quickly and accurately effecting a settlement of all accounts in a single community or in a large number of communities having accounting relations with one another, and facilitating the settlement of all accounts without recourse to the payment of money, or the making of checks and similar negotiable instruments for the purpose of settling accounts. Fundamentally, the invention is applicable to the settlement of all accounts of all communities, whether confined to town or city accounts, or extended to State, national and international exchanges.

The sum of the accounts which the individuals of a community owe and of the accounts which are due to the individuals of a community, though large, usually offset each other to a large extent, because the individuals of the community are chiefly engaged in work for or trade with one another. For this reason it is not necessary that each individual in account with another make payment to or receive payment from that other in order to settle the account. It is only necessary that the accounts payable be offset as far as possible against the accounts receivable in such a community in any way whatever that will permit the settlement of such accounts in full, in order that the greater portion, and indeed usually substantially all, of the accounts of that community, may be settled. We deem it desirable, however, in offsetting debits and credits of a community against each other, to bring a plurality of accounts into accounting relation with one another in such a manner as to permit the cancellation, as far as possible, of the debits and credits of the accounting group, chain or circuit of persons and bills thus brought into accounting relation. For example, if we assume that the individuals of a community be numbered from 1 up, then if No. 1 owes No. 2 a given amount, and No. 2 owes No. 3 the same amount, and No. 3 owes No. 1 a like amount, it is obvious that by pairing Nos. 1 and 2, Nos. 2 and 3, and Nos. 3 and 1, we obtain three accounting pairs which when associated constitute an accounting group, chain or circuit in which all of the accounts of Nos. 1, 2 and 3 are offset against one another, and through the completion of which all of the accounts of Nos. 1, 2 and 3 with one another may be settled and closed. When, however, No. 1 owes No. 2 a given amount, and No. 2 owes No. 3 a different amount, and No. 3 owes No. 1 an amount different from either of the other two amounts, it is clear that while three accounting pairs are formed as before, and are associated as before to form an accounting group, chain or circuit, it is not possible to settle and close all of the accounts of Nos. 1, 2 and 3 with one another, but that it is a simple matter to settle the lowest amount due to or receivable by any one of the three from another. When such a partial accounting is made, it is also obvious that the balance may be settled, partially or wholly, by bringing other members of the community, such as Nos. 4, 5, etc., into accounting relation with Nos. 1, 2 and 3. Thus, by having a large number of members of a community in accounting relation with one another a very large percentage of the accounts of that community may be settled quickly without necessitating any payment by any individual to another, and without the passing of any money, check or equivalent negotiable instrument, it being merely necessary to determine which members of the community can be brought into accounting relation with one another in such a manner that their debits and credits when aggregated will, to a large extent, cancel each other.

In the present invention we have provided machinery suitable for readily carrying into effect such a method or system of accounting. The means employed and the manner in which the apparatus may be constructed, organized and operated, may be varied within wide limits, but in all cases the means used will be capable of bringing into accounting relation in the apparatus debit and credit accounting components of such a nature as to be capable of being brought into operative relation with one another to form, in the apparatus accounting groups, chairs, or circuits, through mechanical, electrical or equivalent agencies, each debit and credit component representing in such a system an account owed by or payable to the individual or member to whom said components correspond. The preferred apparatus or system employed by us for settling the accounts of a community, or of many communities, in accordance with the principles just stated, is an accounting exchange in which each member of the exchange is represented by a set of accounting components containing one or more debit components and one or more credit components, and in which, preparatory to offsetting as far as possible, a debt owing by one member to another, a debit component of such first member is first brought into accounting relation with a credit component of such other member, to indicate an accounting relation between these two members of the exchange. Such a debit component of one member when associated with a credit component of another member forms with said credit component an accounting pair. These two components forming parts of the apparatus represent statements of account which may be placed in files or racks associated with the debit and credit components of the system, but need form no part of the exchange itself. The sets of accounting components comprised in the exchange will be as many in number as there are members of the exchange, each set having its appropriate debit and credit components, with the sets preferably arranged in series, the debit components in one series and the credit components in another, as a matter of convenience. Any desired number of pairs (more than one) of debit and credit components of different sets may be established by suitable means for associating or connecting in the exchange debit and credit components of different sets, and the pairs so established may also be associated or connected in any suitable manner to bring about an accounting relation of a large number of such accounting pairs with one another. In order to establish or complete in the exchange an accounting chain or circuit, as distinguished from an accounting group made up of several accounting pairs, it is necessary to bring into accounting relationship with one another a plurality of accounting pairs in which the first and last elements of the accounting pairs so established in the exchange are debit and credit components of the same set. Such a chain is established whenever a series of accounting pairs is completed, as in the example before referred to, viz., when three accounting pairs are completed consisting of components representing Nos. 1 and 2, 2 and 3, and 3 and 1. Obviously it is a matter of no importance which members of the exchange have the opposite accounting components representing them connected in pairs and then in a chain, it being only necessary that a complete accounting relationship be established in the exchange from the point of beginning through the series back to the point of beginning. In a system of this kind it is believed that all of the operations can best be controlled electrically, for which reason we prefer to embody the invention in an electrical accounting exchange which, as at present embodied, contains a series of sets of electrically-differentiated accounting components, preferably positive and negative components, for the purpose of distinguishing debit and credit elements of each set from each other. When such an electrical exchange is employed, it will also be found most convenient to make use of devices and connections similar, generally speaking, to those employed in telephone exchange work, such for example as plug-and-cord connections for bringing about the necessary electrical relations between differentiated components of different sets. We prefer to employ such connections as these for completing accounting pairs in the exchange, the making of the connections for such pairs being substantially similar to the making of connections between telephone subscribers in a telephone exchange. By means of such connections any number of accounting pairs necessary to a given accounting chain or circuit may be temporarily established in the exchange, and through them also the different accounting pairs may be connected with one another, and a closed path or circuit formed for the passage of the electric current, which path or circuit may be energized in any suitable way. In the system which will be particularly described, in the present case, the bringing of a plurality of accounting pairs into an accounting chain or circuit results in a dead accounting circuit, that is, a closed path for the passage of electric current, through which current does not usually flow at the moment of the closure of said dead accounting circuit, the current being supplied to such circuit after the closure of the same. The elements of the system are so related to one another, however, that as many different temporary accounting circuits may be formed in the exchange, one at a time, as there are permutations of the whole number of debit and credit components of the series actually used in any given exchange. In this respect, it will be noticed, our accounting exchange differs radically from a telephone exchange. In a telephone exchange it is customary to make connections between terminals representing only two subscribers' instruments; whereas in our accounting exchange connections may be made which will close a circuit through any number of accounting sets from two up to the total number in the exchange.

Whenever an accounting chain or circuit is established in the apparatus of the exchange by any instrumentalities in accordance with our invention, the fact should be indicated, in order that it may be easy to determine at a glance just which members represented in the exchange are in accounting relation with one another. It is preferable to indicate not only the fact that such an accounting chain or circuit has been formed but also the particular accounts which, or members who, are in accounting relation. This will be done in any suitable way, but preferably by small electric lamps similar to those used in telephone exchanges, one of which will preferably be associated with each accounting set in the exchange. With such an organization of the parts an indicator or light will show for each accounting set in a circuit whenever such an accounting circuit is closed in the exchange, and thus it will be seen at once that such a circuit has been closed, and also between what accounting sets in the exchange said circuit is established. It being understood that every connection between a debit component of one set and a credit component of another set will be effected because of the existence of an account between the members represented by such sets, and usually because also of the existence of a balance in favor of the member represented by the credit component; and it being further understood that when a circuit is established through the components representing any two or more members of the exchange, all of the accounts corresponding to the accounting pairs of the circuit will be conveniently located for reference, it will be seen that the labor of determining when an accounting circuit exists comprising a plurality of members, especially when this circuit includes a very large number of members of an exchange, will be transferred from the book-keeper or book-keepers, who would have to perform this work in the absence of mechanism for determining such facts, and will be imposed upon mechanism. This mechanism, though manually controlled so far as the establishment of accounting pairs is concerned, shows automatically when such an accounting circuit is completed. The removal of this enormous labor from book-keepers, and the placing of this labor upon the mechanism of the accounting exchange, which mechanism performs the work quickly, easily and with precision, is the most important reason for the embodiment of a system of accounting of this general nature largely in mechanism. This mechanism, especially when in the form of an electrical accounting exchange, is capable of performing with ease all of the difficult, intricate and laborious tracing of accounting relationships, among a large number of persons, firms, etc., a work which it would be extremely difficult, and in practice probably impracticable, for book-keepers to do by mental effort alone.

Other features of the invention not hereinbefore referred to will be hereinafter described and claimed and are illustrated in the accompanying drawings, in which—

Figure 1 is a diagram illustrating with as few elements as possible, to avoid confusion, an electrical accounting exchange of a very simple type embodying our invention and the main features of an electrical accounting exchange such as on a larger scale will be used in actual practice. Fig. 2 is a diagram illustrating the indicating means for showing the completion of an accounting circuit.

Similar characters designate like parts in all the figures of the drawing.

In the accounting exchange illustrated in the drawings as an exemplification of the invention, we have shown a plurality or series of sets of accounting components each of which sets has at least one debit component and at least one credit component. These components are illustrated graphically by circles, and may be any mechanical, electrical or other devices suitable for association or connection in the exchange in such a manner as to bring about a coöperative relation among a plurality of accounting pairs to form an accounting group, chain or circuit. For the sake of simplicity only four sets of these components are illustrated in the present case, the debit components being designated by 1, 2, 3 and 4, and the credit components by 1', 2', 3' and 4'. As actually illustrated as parts of an electrical accounting exchange these debit and credit components are suitable means, such as plug-and-cord connections similar to those used in telephone connections, for connecting debit and credit elements of different accounting sets to form an accounting pair. In Fig. 1 wherever dotted-line connections between debit and credit components are illustrated these represent a temporary electrical connection actually established, as by plug-and-cord connections, in a manner well understood in telephone work. Where no dotted-line connections are shown the debit and credit components from which dotted lines do not lead are not in accounting relation with any other accounting set, and the cord is in its normal position out of use. The debit and credit components in an electrical accounting exchange should be electrically differentiated from each other in some suitable manner. The simplest way to differentiate them is by placing the debit components in one side of an electric circuit, and the credit components in the other side, the debit components being here shown and marked as positive and the credit components as negative.

Associated with each individual set of accounting components in an electrical accounting exchange will preferably be some indicating means for signaling or showing when an accounting relation has been established among the elements of an accounting group, chain or circuit. This means is provided for the purpose of obtaining a practically instantaneous indication by and in the mechanism of the exchange of the completion of such group or circuit, and this indication when it appears may serve as an order to an attendant to inspect all the accounts so brought into accounting relation with one another and settle one or more of them, or all if possible, according as one or another mode of effecting settlements is employed in connection with the exchange. The method preferably employed in connection with the exchange actually illustrated is the settlement of the lowest of the several accounts thus brought into accounting relation with each other or with one another. The indicating means employed may also be of any suitable type, but as before stated it will preferably include, or control the operation of, small electric lamps similar to the indicators used in telephone exchange work. Three of these lamps, 1ª, 2ª and 4ª, are shown in Fig. 2.

While it is important to provide means for indicating the establishment of an accounting group or circuit, it will in actual practice be equally important to prevent the giving of a false signal on the completion of an electric circuit through a plurality of accounting components not actually in true accounting relation with one another, that is, not actually constituting an accounting group representing accounts that can be partially or wholly offset or settled in the manner before described. For this reason, while suitable indicating or equivalent or other means for calling attention to the establishment of an accounting group or circuit is essential, it is hardly less important to provide means for preventing the giving of a false indication or signal by such means. For this reason we prefer to employ as the indicating or equivalent means electro-selective means or devices which may, for example, indicate only for electric current having one particular characteristic, and will not indicate for electric current having any other characteristic, even if such a current should happen to flow through indicating means connected in a closed electric circuit. We have shown herein, as the primary element of such indicating means current-selective means of the polarized type and an indicator responsive only to current of one polarity and unresponsive to current of the other polarity even if it flows through such means.

While a single indicating means or device of any of the general types just mentioned is sufficient for the purpose of indicating when an accounting group or circuit is established, it is preferable in all cases to provide indicating means for each set of accounting components in the accounting exchange, in order that an attendant may see at a glance not only that an accounting circuit has been established, but through just which elements of the exchange the group or circuit is formed. The lamps 1ª, 2ª and 4ª shown in Fig. 2 correspond to the accounting sets illustrated by the debit and credit components 1—1′, 2—2′ and 4—4′, no indicating means being illustrated in Fig. 2 for the accounting set 3—3′ for the reason that in Fig. 1 no connection is made from either the debit or the credit component of this set to any other set.

The primary elements of the individual indicating means just mentioned are in the apparatus here illustrated polarized electromagnets, which are designated respectively by 1ᵐ, 2ᵐ, 3ᵐ and 4ᵐ. The type of polarized magnet shown is one having two movable armatures similarly polarized, each being positive in the construction illustrated. When current flows through the coils of any one of these electromagnets in the direction indicated by the arrows in Fig. 1 it will be obvious that the armature at the right will be attracted, while the armature at the left will be repelled (both armatures being usually held away from the poles of the magnet by springs, as shown), and that this movement of the right-hand armature may be used as a means for closing an indicating circuit. The armatures of the magnets shown are designated respectively by 5—6, 7—8, 9—10, and 11—12. Associated with each of these armatures is a contact from which a conductor leads, the conductors from one set of contacts going through the lamps, while those from the other set of contacts are connected to suitable means for preventing the lighting of the lamps, as for example by opening the circuit thereto. The contacts which are connected with the conductors for preventing lighting of the lamps are designated respectively by 13, 14 and 15, while those which are connected directly in the lamp circuits are designated respectively by 16, 17 and 18. The contacts 13, 14 and 15 are all connected to a common conductor 19 leading in this case to a relay magnet 20 having an armature 21, while the contacts 16, 17 and 18 are connected individually to the lamps 1ª, 2ª and 4ª, which in turn are connected at their opposite terminals to a common conductor 22 leading to the contact 23 of said relay. The positive sides of the polarized magnets are all connected to a common conductor 24 leading to a source of energy, such as the battery 25. The other side of this battery is connected to the conductor 26, which leads to the armature 21 of the relay, from which a conductor 27 leads to the other side of the relay 20 from that to which the conductor 19 is connected. When current is passed through the coils of the polarized magnets in the direction shown by the arrows in Fig. 1 it will be evident that the armatures 6, 8 and 12 will be attracted and circuits closed through the lamps 1ª, 2ª and 4ª from the source of energy 25, as all of the breaks at 16, 17 and 18 will be closed by the attraction of the armatures 6, 8 and 12, and the gap at the relay between 21 and 23 is always normally closed. This permits the current to pass through all of the lamps in the circuit to light the same and indicate not only that an accounting group or circuit has been established but that the members of the exchange who are in accounting relation with one another are those represented by the lamps 1ª, 2ª and 4ª, that is to say, members one, two and three of the exchange illustrated in Fig. 1. On the current flowing through the coils of any one or more of these polarized magnets in the opposite direction to that indicated by the arrows in Fig. 1, it will be seen that the polarities of the magnets being reversed the armatures 6, 8 and 12, or some of them, will be repelled instead of being attracted, and the armatures 5, 7 and 11, or some one or more of them (if current flows in that direction through less than all of them), will be attracted and a circuit closed through some one or more or all of the contacts 13, 14 and 15, whereupon the relay 20 will be energized and the circuit of the lamps 1ª, 2ª and 4ª opened at the contact 23 by the attraction of the armature 21. This will prevent the lighting of any lamp and the consequent giving of a false indication or signal. It will be clear that so long as the breaks at 16, 17 and 18 are open the lamps will remain unlighted even if the circuit be closed at the contact 23. In order, however, to prevent the giving of a false signal when all but one of a group of accounting sets are in proper accounting relation, in which case current might properly pass in the direction indicated by the arrows in Fig. 1, through all but one of the polarized magnets of the group, it is important to provide some device, such for example as the relay shown in Fig. 2, common to all of the accounting sets, which will prevent the giving of a signal through any of the signaling means if an improper current flows through any single individual indicating device.

Referring again to Fig. 1, while any proper means may be employed for bringing into accounting relation accounting pairs that have actually been established in the exchange by the bringing into accounting relation of debit and credit—that is, positive and negative—components of different accounting sets, we have shown in that figure, as a simple and convenient means for accomplishing the desired result, electrical conductors permanently connected to positive and negative contacts, through which current may be passed. In other words, we prefer to permanently connect the positive component, (which is here shown as the debit component), of each accounting set to one positive contact or terminal of a group of positive contacts or terminals, and to permanently connect each negative or credit component in a similar manner to one negative contact or terminal of a group of negative contacts or terminals complementary to such positive contacts or terminals. Conductors connecting the positive components and positive terminals are indicated at 28 and 29, and conductors connecting negative components with negative terminals are indicated at 30 and 31. A series or circuit of positive terminals is shown in Fig. 1, the individual elements being designated by 32 to 43 respectively, while coöperating with these is a corresponding series or circuit of negative terminals, designated by 32' to 43' respectively. These two sets of positive and negative terminals are preferably centered around the axis of circuit-controlling means, such as a rotary switch-arm, indicated in dotted lines at 44, which preferably carries positive and negative contacts 45 and 45', connected by conductors, such as 46 and 47, to positive and negative terminals 48 and 49, these being preferably connected in turn with a source of energy, such as 50, in any suitable manner, through connections, however, which are always closed so as to permit passage of current from said source of energy.

The positive and negative contacts 45 and 45' are in the construction shown embodied in an insulating head 51, which is preferably knife-edged and adapted to travel in a path between the positive and negative contacts of the series and separate the same. The object of this is to energize the closed accounting circuit formed by bringing accounting pairs into proper accounting relation, it being evident that without some means for connecting the source of energy in circuit therewith any closed accounting circuit would be a dead circuit, that is, one consisting merely of a metallic conducting path closed on itself but traversed by no current.

It will be clear from the foregoing that an accounting pair is established in an electrical exchange, such as shown in Fig. 1, by merely connecting one polarized magnet, temporarily, and one component of its set with the opposite component and opposite side of the polarized magnet of another set, and that when an accounting pair is thus formed any two or more of such accounting pairs constitute a complete accounting circuit if the first and last elements connected are debit and credit components of the same set. Thus in Fig. 1 a complete circuit can be traced from the polarized magnet of the first accounting set through the magnets of the second and fourth sets back to the point of beginning, this circuit being a dead accounting circuit until energized by the automatic opening of one of the three pairs of positive and negative contacts or terminals through which the circuit is partially established. It will be noticed that each accounting pair in this circuit comprises a polarized magnet, a debit component connected to one terminal of said magnet, a credit component connected to the other terminal of said magnet, connections from said debit or positive component to a positive contact or terminal of one pair, and connections from said credit or negative component to the negative contact or terminal of a different pair. Whenever current is introduced into such a dead accounting circuit, as by the opening of any pair of terminals by the insulating head 51 of the rotary switch 44, and the electrical connection momentarily of contacts 33—45, and 33'—45', a closed electric circuit results, through which current from the source of energy 50 passes, energizes all of the polarized magnets in circuit in the same manner, and closes all the lamp circuits corresponding to said polarized magnets in the manner before described.

Many variations of the arrangement of debit and credit components described in detail may be made. One is illustrated in Fig. 1, from which it will be seen that the fourth set is permanently connected on the main board of the exchange by plug-and-cord or other connections, and these debit and credit components connected in turn with two series of debit and credit components on a smaller switch-board at the right of the main board. This smaller board represents a large number of accounts of the fourth member of the exchange with other parties. The different accounting sets are indicated by $4^u$, $4^v$, $4^w$ and $4^x$. This board differs from the main board in that the positive side of all sets may be connected directly with the positive component of No. Four on the main board, and the negative side of all sets correspondingly connected with the negative component of the fourth member on the main board. This variation in organization, however, embodies no departure from the principles hereinbefore set forth.

While the main switchboard is illustrated as having only four sets of components, twelve pairs of positive and negative terminals are illustrated, in order to indicate that the system will always have a considerable number of pairs, and that it is capable of great extension as compared with the simple exchange board illustrated in the present case. A further object of illustrating a considerable number of pairs of terminals adapted to be opened in succession by an automatic switch, such for example as that shown, is to permit the illustration of means for properly balancing the resistance of a circuit which may contain at different times either a large number or a smaller number of polarized magnets, each wound with coils of considerable resistance.

In order that the resistances of all accounting circuits through which current may flow individually from time to time may be kept within proper working limits, we provide means, preferably controlled by the resistance of any energized accounting circuit which may be closed, for automatically cutting in or out resistance in accordance with the requirements. The terminals 48 and 49 leading from the automatic switch are connected in a closed partial electric circuit which includes in this case not only the source of energy 50, but also resistances capable of being automatically cut in or out according as the resistance of the polarized magnets in circuit is little or great. Here three relay magnets 51, 52 and 53 are shown connected electrically in series with one another and with said source of energy 50. Their terminals are indicated at 54, 55 and 56. The armatures of the first two are normally on their contacts 57 and 58, and through them are connected in series directly with the relay 53 and the source of energy. When, however, a heavy current flows through the circuit including said relay owing to the presence in the circuit of a small number of polarized magnets, one or both of the relays 51 and 52 which, it should be stated, are of different resistances, may be energized by the current in the circuit, in which case one or both may attract its armature or their armatures according as the strength of the current is little or much above that required to saturate the magnets.

Resistances, such as 59 and 60 are connected in shunt with the armatures and their contacts, these being also preferably different. From this organization of the relays and the shunt resistances 59 and 60 it will be seen that the resistance in circuit between the automatic switch and the battery may be either that of three relays connected in series or that of said relays plus one or both of the shunt resistances 59 and 60. In a large exchange any necessary extension or variation may be made of this principle of maintaining the resistance of the energized accounting circuits approximately uniform.

Whenever an accounting group is established or an accounting circuit closed in the exchange we prefer to stop the operation of the automatic means just described for tracing out the fact and making the necessary coöperative or electrical connections. This automatic stopping means may be a simple uncoupling device, such as 61, coöperative with corresponding clutch members 62 and 63, and controlled by the armature of a relay 64 in a local circuit governed by the relay 53. This local circuit, as here shown, comprises merely the coils of the relay 64, a source of energy 65, the armature 56 of the relay 53, and the contact 66 of said relay, all connected by suitable conductors. The automatic stopping action obviously takes place instantaneously when the relay 53 is energized. The devices shown are intended to stop the rotation of the switch-arm 44 secured to the shaft 67.

The apparatus hereinbefore described is sufficient for establishing accounting pairs and accounting circuits, but it is not sufficient to test each accounting set to determine whether it is in accounting relation with any other set. In order to effect this testing we may employ positive and negative testing-arms, such as 68 and 69, the former of which rotates at considerable speed and moves successively over a series of positive contacts, such as 70, corresponding to the positive terminals, while the arm 69, by means of suitable mechanism (not shown) moves in the same direction, has a movement of one step for each complete rotation of the arm 68, and moves over a complementary set of negative contacts 71, each of which is permanently connected by a short conductor 72 with the corresponding positive contact 70. Through this automatic testing apparatus, the arms of which may be mounted for movement about the same axis as the switch-arm 44, all of the accounting sets, to which said testing contacts correspond, may be constantly tested to determine whether any one of them has any accounting relation with any other set, even if such set is not brought into an accounting circuit.

We have not illustrated herein the details of the equipment which would ordinarily be employed in a large exchange for the convenience of the operators, bookkeepers, etc., charged with the duty of making the temporary electrical connections or the necessary changes in the entries of the accounts of the parties in accounting relation with one another. Such equipment is illustrated in detail in another application filed by us July 21st, 1908, Ser. No. 444,585. It has been omitted from the present case in order that the collateral equipment, not forming part of the accounting apparatus proper, may not be confused with the accounting apparatus itself.

The exchange equipment in practice will preferably include a switchboard at which the temporary connections for the different accounting circuits will be made at one side of the board by suitable operators, while bookkeepers or others at the opposite side of the board may make the necessary entries of the settlements indicated by the lamps $1^a$, $2^a$, etc. The equipment may be analogous to that of a telephone exchange. The board will be divided into sections corresponding to the different accounts, there being both debit and credit sections, the former carrying both debit components and debit indicators or lamps; while the latter carries both credit components and credit indicators or lamps. These sections will usually be in the form of racks containing accounts in card form, which cards will show what accounts are owed by the debit section and what are owing to the credit section. The components or jacks for controlling both accounting and indicating will usually be located at the front of the board, while the lamps for indicating will preferably be located at the back of the board. The racks themselves will usually be so arranged that the account cards may be placed in the racks in inclined positions, one above the other, in such a manner that the state of the account on each card will show to the plugging-in operator at the bottom of the card, and to the bookkeeper stationed at the back of the board the state of the account will usually show at the top of the back of the same card. Moreover, the visible lower portion of the front of each card will preferably be arranged in line with the particular accounting and indicating jacks corresponding to that account, while the upper portion of the back of the card will be in line with the particular indicator or lamp at the back of the board corresponding to the same account. By employing collateral equipment of this kind in connection with the necessary apparatus of the accounting exchange proper the operator making the temporary connections has only to look at the bottom of each card to determine the state of an account and whether a plug should be inserted, while the bookkeeper at the back of the board has only to watch the lamps, and if one of them is lighted it becomes his duty then to remove the card containing at the upper end of the back part thereof an account showing in line with such lighted lamp, and then make the proper adjustment of the account and change the figures both at the bottom of the front and at the top of the back of said card, as may be necessary. By comparing the debit and credit cards brought into accounting relation he sees at once just which accounts are in such relation and what changes it is necessary to make in each account in order to make the adjustment of accounting relations indicated to him by the action of the accounting apparatus proper. In other words, when the apparatus has determined for the bookkeeper just which accounts are in accounting relation it is a small matter for the bookkeeper to make on said cards the necessary bookkeeping entries to bring about an adjustment of relations. The main function of the accounting apparatus proper is to relieve the bookkeeper of the labor of determining which ones of a multiplicity of accounts are in condition for adjustment.

The division of labor between the mechanism of the exchange on the one hand and the members of the exchange and the attendant operators, bookkeepers, etc., on the other hand may be better understood from a complete example illustrating the manner in which accounts are settled. The first requisite is that each member of the exchange send to the management of the exchange either a statement of his bills receivable or individual bills showing the amounts due him. These bills are sent to the management of the exchange instead of to the debtors in order that they may be settled by the conjoint action of the mechanism of the exchange and the attendant operators. The bills may be made out by the individual members on the cards of the exchange (previously described), or debit and credit cards showing the persons to and from whom accounts are due, and the amounts of the same, may be made out by the bookkeepers of the exchange. In either case these cards will then usually be placed in racks, debit cards in debit racks and credit cards in credit racks, all arranged, preferably, in the manner before described. As fast as the cards are placed in the racks by the bookkeepers, the plugging-in operators should plug in with their jacks and electrically connect debit and credit components representing each pair of members shown by such card to be in accounting relation—that is, each pair of members one of whom, as shown by such card, owes a balance to the other.

Taking for example the simple case before mentioned, of members Nos. 1, 2 and 3, owing one another different amounts, No. 1 sends in to the management of the exchange, preferably in card form, his bill against No. 2 for say $5.00, No. 2 sends in his bill against No. 3 for say $7.25, and No. 3 sends in his bill against No. 1 for say $9.40. These bills or cards are turned over to the bookkeeper at the back of the switchboard and are placed in their proper positions in the racks by the bookkeeper. As fast as the cards are placed in the racks, the operator at the front of the switchboard will, by properly plugging in, establish the necessary temporary electrical connections between Nos. 1 and 2, Nos. 2 and 3, and Nos. 3 and 1 in the manner before described. Through the accounting circuit thus established current is caused to flow to light the indicating lamps showing that the mechanism of the exchange has determined that members Nos. 1, 2 and 3 are in accounting relation with one another. Thereupon the bookkeeper will remove from the racks the three cards just specified, will cancel the bill of No. 1 against No. 2 for $5.00, will subtract $5.00 from the bill of No. 2 against No. 3 for $7.25 and restore the card to its proper place in the rack with a balance of $2.25 appearing upon it, and will subtract $5.00 from the bill of No. 3 against No. 1 for $9.40 and restore this card also to its proper place in the rack with a balance of $4.40 appearing upon it. The canceled bill of No. 1 against No. 2 will not, however, be restored to the rack. On the removal of these cards from the racks the operator at the front of the switchboard withdraws the plugs, breaks the circuit just described, and the indicator lamps are automatically extinguished. When the second and third cards are restored to the racks with the new balances showing, the operator reëstablishes the second and third sets of connections just described, but does not reëstablish the first set of connections, and no circuit will be closed until the accounts of another group are brought into accounting relation.

The plugging-in and bookkeeping operations just described will be repeated at short intervals as cards are inserted in and removed from the racks, and accounting circuits will be closed and broken in rapid succession; and after each circuit has been closed the proper cancellation or deductions will be made. It will be obvious that, with a large exchange, practically all of the members of which are doing business with one another, the offsetting of accounts and the cancellation or deduction of obligations may proceed very rapidly, and all of the balances due on transactions represented by the bills brought into the exchange may be settled promptly through the conjoint action of the mechanism of the exchange and the operators, bookkeepers, etc., of the exchange, without the use of currency, checks, or other negotiable instruments.

What we claim is:

1. An accounting exchange, comprising a series of sets of accounting components, each set embodying debit and credit components, and means for selectively grouping a plurality of pairs of debit and credit components of different sets.

2. An accounting exchange, comprising a series of sets of accounting components, each set embodying debit and credit components, and means for selectively grouping a plurality of pairs of debit and credit components of different sets to form an accounting chain the first and last elements of which are debit and credit components of the same set.

3. An accounting exchange, comprising a series of sets of accounting components, each set embodying debit and credit components, and electrical means for selectively grouping a plurality of pairs of debit and credit components of different sets.

4. An accounting exchange, comprising a series of sets of accounting components, each set embodying debit and credit components, means for selectively grouping a plurality of pairs of debit and credit components of different sets to form an accounting chain the first and last elements of which are debit and credit components of the same set, and means for indicating the existence of an accounting chain.

5. An accounting exchange, comprising a series of sets of accounting components, each set embodying debit and credit components, means for selectively grouping a plurality of pairs of debit and credit components of different sets to form an accounting chain the first and last elements of which are debit and credit components of the same set, and means controlled by a completed accounting chain for indicating the existence thereof.

6. An accounting exchange, comprising a series of sets of accounting components, each set embodying debit and credit components, and means for temporarily associating any two debit and credit components of different sets and for selectively grouping a plurality of pairs of such associated debit and credit components of different sets.

7. An accounting exchange, comprising a series of sets of accounting components, each set embodying debit and credit components, and means for temporarily associating any two debit and credit components of different sets and for selectively grouping a plurality of pairs of such associated debit and credit components of different sets to form a temporary accounting chain the first and last elements of which are debit and credit components of the same set.

8. An accounting exchange, comprising a series of sets of accounting components, each set embodying debit and credit components, and means for temporarily connecting any two debit and credit components of different sets and for selectively grouping a plurality of pairs of such connected debit and credit components of different sets.

9. An accounting exchange, comprising a series of sets of accounting components, each set embodying debit and credit components, and means for temporarily connecting electrically into an accounting pair any two debit and credit components of different sets and for selectively grouping a plurality of such accounting pairs.

10. An accounting exchange, comprising a series of sets of accounting components, each set embodying debit and credit components, and means for temporarily connecting electrically into an accounting pair any two debit and credit components of different sets and for electrically connecting a plurality of such accounting pairs.

11. An accounting exchange, comprising a series of sets of accounting components, each set embodying debit and credit components, and means for temporarily connecting electrically into an accounting pair any two debit and credit components of different sets and for selectively grouping a plurality of such accounting pairs to form a temporary accounting chain the first and last elements of which are debit and credit components of the same set.

12. An accounting exchange, comprising a series of sets of accounting components, each set embodying debit and credit components, and means for temporarily connecting electrically into an accounting pair any two debit and credit components of different sets and for electrically connecting a plurality of such accounting pairs to form a temporary electric accounting circuit the first and last elements of which are debit and credit components of the same set.

13. An electrical accounting exchange, comprising a series of sets of electrical accounting components, each set embodying electrically-differentiated components, and means for selectively grouping a plurality of pairs of differentiated components of different sets.

14. An electrical accounting exchange, comprising a series of sets of electrical accounting components each set embodying positive and negative components, and means for selectively grouping a plurality of pairs of positive and negative components of different sets.

15. An electrical accounting exchange, comprising a series of sets of electrical accounting components, each set embodying electrically-differentiated components, and means for selectively connecting in an electric accounting circuit a plurality of pairs of differentiated components of different sets.

16. An electrical accounting exchange, comprising a series of sets of electrical accounting components each set embodying positive and negative components, and means for selectively connecting in an electric accounting circuit a plurality of pairs of positive and negative components of different sets.

17. An electrical accounting exchange, comprising a series of sets of electrical accounting components, each set embodying electrically-differentiated components, and means for selectively connecting in an electric accounting circuit a plurality of pairs of differentiated components of different sets, the first and last elements of which accounting circuit are differentiated components of the same set.

18. An electrical accounting exchange, comprising a series of sets of electrical accounting components each set embodying positive and negative components, and means for selectively connecting in an electric accounting circuit a plurality of pairs of positive and negative components of different sets, the first and last elements of which accounting circuit are positive and negative components of the same set.

19. An electrical accounting exchange, comprising a series of sets of electrical accounting components, each set embodying electrically-differentiated components, means for selectively connecting in an electric accounting circuit a plurality of pairs of differentiated components of different sets, and means for indicating the completion of said accounting circuit.

20. An electrical accounting exchange, comprising a series of sets of electrical accounting components, each set embodying electrically-differentiated components, means for selectively connecting in an electric accounting circuit a plurality of pairs of differentiated components of different sets, and means controlled by the completion of said accounting circuit for indicating the completion thereof.

21. An electrical accounting exchange, comprising a series of sets of electrical accounting components, each set embodying electrically-differentiated components, and means for temporarily connecting electrically into an accounting pair any two electrically-differentiated components of different sets and for connecting in an electric accounting circuit a plurality of such accounting pairs.

22. An electrical accounting exchange, comprising a series of sets of electrical accounting components each set embodying positive and negative components, and means for temporarily connecting electrically into an accounting pair any two positive and negative components of different sets and for connecting in an electric accounting circuit a plurality of such accounting pairs.

23. An electrical accounting exchange, comprising a series of sets of electrical accounting components, each set embodying electrically-differentiated components, and cord-and-plug connections for temporarily connecting electrically into an accounting pair any two electrically-differentiated components of different sets and for connecting in an electric accounting circuit a plurality of such accounting pairs.

24. An electrical accounting exchange, comprising a series of sets of electrical accounting components, each set embodying positive and negative components, and cord-and-plug connections for temporarily connecting electrically into an accounting pair any two positive and negative components of different sets and for connecting in an electric accounting circuit a plurality of such accounting pairs.

25. An accounting exchange, comprising a series of sets of accounting components, each set embodying debit and credit components; and manual and automatic means conjointly operative for selectively grouping a plurality of pairs of debit and credit components of different sets.

26. An accounting exchange, comprising a series of sets of accounting components, each set embodying debit and credit components, and manual and automatic means conjointly operative for selectively grouping a plurality of pairs of debit and credit components of different sets to form an accounting chain the first and last elements of which are debit and credit components of the same set.

27. An accounting exchange, comprising a series of sets of accounting components, each set embodying debit and credit components, and manually and automatically operated electrical means conjointly operative for selectively grouping a plurality of pairs of debit and credit components of different sets.

28. An accounting exchange, comprising a series of sets of accounting components, each set embodying debit and credit components, manual and automatic means conjointly operative for selectively grouping a plurality of pairs of debit and credit components of different sets to form an accounting chain the first and last elements of which are debit and credit components of the same set, and means controlled by such automatic means for indicating the existence of said accounting chain.

29. An electrical accounting exchange, comprising a series of sets of electrical accounting components, each set embodying electrically-differentiated components, and manual and automatic electrical means conjointly operative for selectively grouping a plurality of pairs of differentiated components of different sets.

30. An electrical accounting exchange, comprising a series of sets of electrical accounting components, each set embodying electrically-differentiated components, and manual and automatic electrical means conjointly operative for selectively grouping a plurality of pairs of differentiated components of different sets to form an accounting circuit the first and last elements of which are differentiated components of the same set.

31. An electrical accounting exchange, comprising a series of sets of electrical accounting components, each set embodying electrically-differentiated components, manual and automatic electrical means conjointly operative for selectively grouping a plurality of pairs of differentiated components of different sets to form an accounting circuit the first and last elements of which are differentiated components of the same set, and means controlled by such automatic means for indicating the existence of said accounting circuit.

32. An electrical accounting exchange, comprising a series of sets of electrical accounting components, each set embodying positive and negative components, and manual and automatic electrical means conjointly operative for selectively grouping a plurality of pairs of positive and negative components of different sets.

33. An electrical accounting exchange, comprising a series of sets of electrical accounting components, each set embodying positive and negative components, and manual and automatic electrical means conjointly operative for selectively grouping a plurality of pairs of positive and negative components of different sets to form an accounting circuit the first and last elements of which are positive and negative components of the same set.

34. An electrical accounting exchange, comprising a series of sets of electrical accounting components, each set embodying positive and negative components, manual and automatic electrical means conjointly operative for selectively grouping a plurality of pairs of positive and negative components of different sets to form an accounting circuit the first and last elements of which are positive and negative components of the same set, and means controlled by such automatic means for indicating the existence of said accounting circuit.

35. An electrical accounting exchange, comprising a series of sets of electrical accounting components, each set embodying positive and negative components, and manual and automatic electrical means conjointly operative for selectively connecting in an electric accounting circuit a plurality of pairs of positive and negative components of different sets.

36. An electrical accounting exchange, comprising a series of sets of electrical accounting components, each set embodying positive and negative components, manual and automatic electrical means conjointly operative for selectively connecting in an electric accounting circuit a plurality of pairs of positive and negative components of different sets, and means controlled by such automatic means on the closing of said accounting circuit for indicating the closure of said circuit.

37. An electrical accounting exchange, comprising a series of sets of electric accounting components, each set embodying two electrically-differentiated components, means for selectively connecting in a dead accounting circuit a plurality of pairs of differentiated components of different sets, and means for electrically energizing said circuit on the completion of the same.

38. An electrical accounting exchange, comprising a series of sets of electrical accounting components, each set embodying positive and negative components, means for selectively connecting in a dead accounting circuit a plurality of pairs of positive and negative components of different sets, and means for electrically energizing said circuit on the completion of the same.

39. An electrical accounting exchange, comprising a series of sets of electrical accounting components, each set embodying two electrically-differentiated components, means for selectively connecting in a dead accounting circuit a plurality of pairs of differentiated components of different sets, and automatic means for electrically energizing said circuit on the completion of the same.

40. An electrical accounting exchange, comprising a series of sets of electrical accounting components, each set embodying two electrically-differentiated components, means for selectively connecting in a dead accounting circuit a plurality of pairs of differentiated components of different sets, and automatic means including a rotary switch for electrically energizing said circuit on the completion of the same.

41. An electrical accounting exchange, comprising a series of sets of electrical accounting components, each set embodying electrically-differentiated components, means for selectively connecting in an electric accounting circuit a plurality of pairs of differentiated components of different sets, and an electro-selective device responsive only to current passing through such an accounting circuit.

42. An electrical accounting exchange, comprising a series of sets of electrical accounting components, each set embodying electrically-differentiated components, means for selectively connecting in an electric accounting circuit a plurality of pairs of differentiated components of different sets, and a current-selective device responsive only to current passing through such an accounting circuit.

43. An electrical accounting exchange, comprising a series of sets of electrical accounting components each set embodying positive and negative components, means for selectively connecting in an electric accounting circuit a plurality of pairs of positive and negative components of different sets, and a polarized magnet responsive only to current passing in one direction through such accounting circuit.

44. An electrical accounting exchange, comprising a series of sets of electrical accounting components, each set embodying electrically-differentiated components, means for selectively connecting in an electric accounting circuit a plurality of pairs of differentiated components of different sets, an electro-selective device responsive only to current passing through such an accounting circuit, and an indicator controlled by said electro-selective device.

45. An electrical accounting exchange, comprising a series of sets of electrical accounting components each set embodying positive and negative components, means for selectively connecting in an electric accounting circuit a plurality of pairs of positive and negative components of different sets, a polarized magnet responsive only to current passing in one direction through such an accounting circuit, and an indicator controlled by said polarized magnet.

46. An electrical accounting exchange, comprising a series of sets of electrical accounting components, each set embodying electrically-differentiated components, means for selectively connecting in an electric accounting circuit a plurality of pairs of differentiated components of different sets, an electro-selective device responsive only to current passing through such an accounting circuit, and an electric light circuit containing an indicating lamp and controlled by said electro-selective device.

47. An electrical accounting exchange, comprising a series of sets of electrical accounting components each set embodying positive and negative components, means for selectively connecting in an electric accounting circuit a plurality of pairs of positive and negative components of different sets, a polarized magnet responsive only to current passing in one direction through such an accounting circuit, and an electric light circuit containing an indicating lamp controlled by said polarized magnet.

48. An electrical accounting exchange, comprising a series of sets of electrical accounting components, each set embodying electrically-differentiated components, and means for selectively connecting a pair of electrically-differentiated components of different sets, current-selective indicators one for each set of accounting components, and means for subjecting said indicators to electrical action of different kinds.

49. An electrical accounting exchange, comprising a series of sets of electrical accounting components each set embodying positive and negative components, and means for selectively connecting a pair of positive and negative components of different sets, polarized indicating means one for each set of accounting components, and means for subjecting said indicating means to the action of electric current flowing in either direction.

50. An electrical accounting exchange, comprising a series of sets of electrical accounting components, each set embodying electrically-differentiated components, means for selectively connecting in an electric accounting circuit a plurality of pairs of differentiated components of different sets, current-selective indicators one for each set of accounting components, and means for subjecting said indicators to electrical action of different kinds.

51. An electrical accounting exchange, comprising a series of sets of electrical accounting components each set embodying positive and negative components, means for selectively connecting in an electric accounting circuit a plurality of pairs of positive and negative components of different sets, polarized indicating means one for each set of accounting components, and means for subjecting said indicating means to the action of electric current flowing in either direction.

52. An electrical accounting exchange, comprising a series of sets of electrical accounting components, each set embodying positive and negative components, two sets of terminals, positive and negative respectively, one terminal for each of said positive and negative components, circuit-closing means embodying positive and negative contacts adapted to move over said sets of terminals respectively, and sectional conductors for selectively connecting in an electric accounting circuit a plurality of pairs of differentiated components of different sets and their corresponding terminals.

53. An electrical accounting exchange, comprising a series of sets of electrical accounting components, each set embodying positive and negative components, two sets of terminals, positive and negative respectively, one terminal for each of said positive and negative components, circuit-closing means embodying positive and negative contacts adapted to move over said sets of terminals respectively, sectional conductors for selectively connecting in an electric accounting circuit a plurality of pairs of differentiated components of different sets and their corresponding terminals, and indicating means responsive only to current passing in one direction through such accounting circuit.

54. An electrical accounting exchange, comprising a series of sets of electrical accounting components, each set embodying positive and negative components, two circuits of terminals, positive and negative respectively, one terminal for each of said positive and negative components, rotary circuit-closing means embodying positive and negative contacts adapted to move over said sets of terminals respectively, and sectional conductors for selectively connecting in an electric accounting circuit a plurality of pairs of differentiated components of different sets and their corresponding terminals.

55. An electrical accounting exchange, comprising a series of sets of electrical accounting components, each set embodying electrically-differentiated components, and means for selectively connecting up, one at a time, as many different electric accounting circuits—each containing a plurality of accounting pairs each consisting of differentiated components of different sets—as there are possible permutations of such accounting pairs.

56. An accounting exchange, comprising a series of sets of accounting components, each set embodying debit and credit components, means for selectively grouping a plurality of pairs of debit and credit components of different sets to form an accounting chain the first and last elements of which are debit and credit components of the same set, a continuously-movable element, and means controlled by said accounting chain for stopping said element.

57. An electrical accounting exchange, comprising a series of sets of electrical accounting components, each set embodying electrically-differentiated components, means for selectively connecting in an electric accounting circuit a plurality of pairs of differentiated components of different sets, a continuously movable element, and means controlled by said accounting circuit for stopping said element.

58. An electrical accounting exchange, comprising a series of sets of electrical accounting components, each set embodying electrically-differentiated components, means including a continuously-movable switch for selectively connecting in an electric accounting circuit a plurality of pairs of differentiated components of different sets, and means controlled by said accounting circuit for stopping said switch.

59. An accounting exchange, comprising a series of sets of accounting components, each set embodying debit and credit components, means for selectively grouping a plurality of pairs of debit and credit components of different sets to form an accounting chain the first and last elements of which are debit and credit components of the same set, a continuously-movable element, and means controlled by the completion of said accounting chain for stopping said continuously-movable element and also controlled by the interruption of such chain for starting said element.

60. An electrical accounting exchange, comprising a series of sets of electrical accounting components, each set embodying electrically-differentiated components, means for selectively connecting in an electric accounting circuit a plurality of pairs of differentiated components of different sets, a continuously-movable element, and means controlled by the closure of the accounting circuit for stopping said continuously-movable element, and by the opening of said accounting circuit for starting said continuously-movable element.

61. An electrical accounting exchange, comprising a series of sets of electrical accounting components, each set embodying electrically-differentiated components, means including a continuously-movable switch for selectively connecting in an electric accounting circuit a plurality of pairs of differentiated components of different sets, and means controlled by the closure of said accounting circuit for stopping said switch, and by the opening of said accounting circuit for starting said switch.

62. An electrical accounting exchange, comprising a series of sets of electrical accounting components, each set embodying electrically-differentiated components having associated therewith an individual resistance, means for selectively connecting in an electric accounting circuit a plurality of pairs of differentiated components of different sets, and means for controlling either resistance in accordance with variations in the total value of said individual resistances in said accounting circuit.

63. An electrical accounting exchange, comprising a series of sets of electrical accounting components, each set embodying electrically differentiated components having associated therewith an individual resistance, means for selectively connecting in an electric accounting circuit a plurality of pairs of differentiated components of different sets, and means governed by the total value of the individual resistances in an accounting circuit for controlling the resistance of such circuit.

64. An accounting exchange, comprising a series of sets of accounting components, each set embodying debit and credit components, and means for effecting coöperation of any two debit and credit components of different sets, and means for testing the components of each set to determine whether they are coöperatively associated with a component of any other set.

65. An electrical accounting exchange, comprising a series of sets of electrical accounting components, each set embodying electrically-differentiated components, means for electrically connecting any two electrically-differentiated components of different sets, and means for electrically testing the components of each set to determine whether they are electrically connected with a component of any other set.

Signed at New York, in the county of New York, and State of New York, this 30th day of January, A. D. 1908.

WILLIAM F. KEMBLE.
CHARLES R. UNDERHILL.

Witnesses:
EDGAR A. FELLOWS,
ROBERT CHAMPION.